H. FELDMEIER.
CENTRIFUGAL LIQUID SEPARATOR.
APPLICATION FILED JAN. 13, 1910.
987,973.
Patented Mar. 28, 1911.
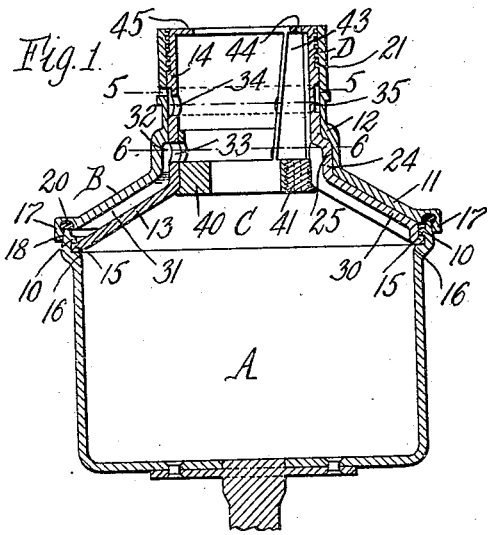
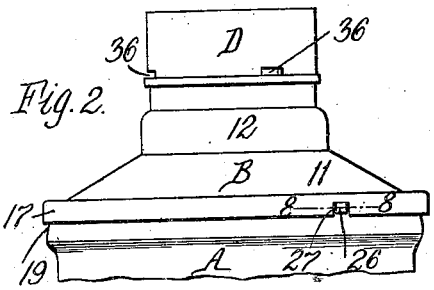
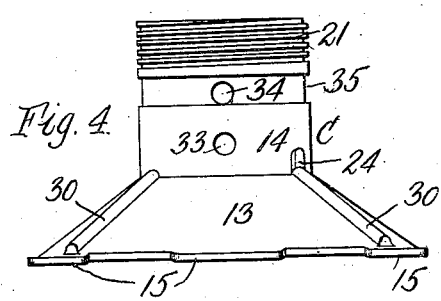
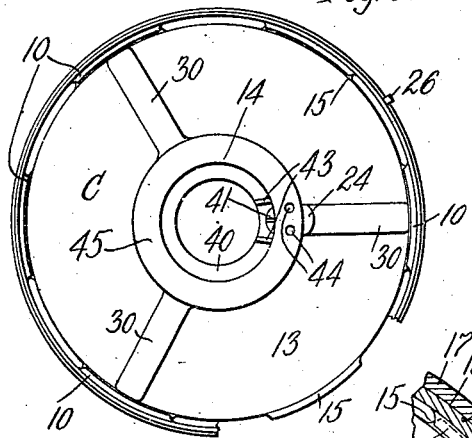
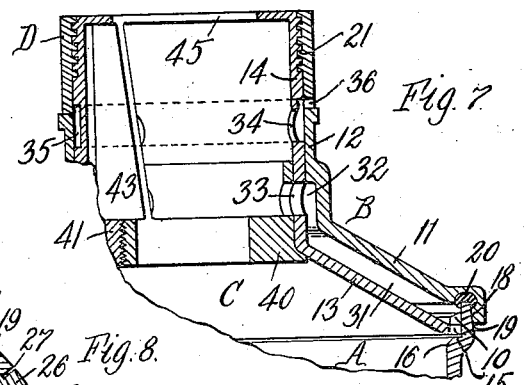
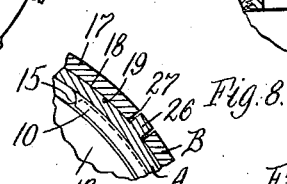
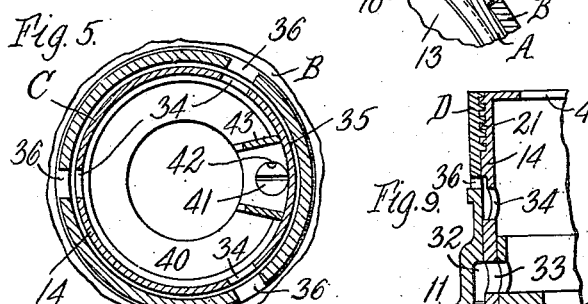
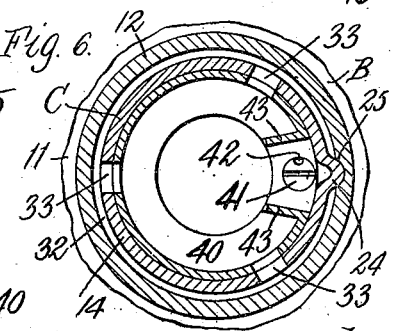
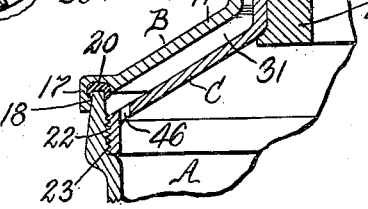
Witnesses.
A. G. Dimond.
C. H. Bund.
Inventor.
Harvey Feldmeier,
By Wilhelm, Parker & Hurd,
Attorneys.

UNITED STATES PATENT OFFICE.

HARVEY FELDMEIER, OF LITTLE FALLS, NEW YORK, ASSIGNOR TO D. H. BURRELL & COMPANY, OF LITTLE FALLS, NEW YORK.

CENTRIFUGAL LIQUID-SEPARATOR.

987,973. Specification of Letters Patent. Patented Mar. 28, 1911.

Application filed January 13, 1910. Serial No. 537,845.

*To all whom it may concern:*

Be it known that I, HARVEY FELDMEIER, a citizen of the United States, residing at Little Falls, in the county of Herkimer and State of New York, have invented a new and useful Improvement in Centrifugal Liquid-Separators, of which the following is a specification.

This invention relates to means for securing the removable cover to the open end of the body of the bowl of a centrifugal liquid separator and for discharging the separated liquids, usually cream and skimmilk, from the bowl, and has particular reference to that class of discharge devices which comprise an internal skimming shield or supplemental cover arranged within or underneath the cover of the bowl, of which class of devices an example is found in Letters Patent No. 741,342, dated October 13, 1903.

The object of this invention is to construct the skimming shield or supplemental cover and connecting parts in such manner that the shield serves, in addition to its usual function, as a means for attaching the removable cover to the body of the bowl and establishing a tight joint between the body and the cover.

In the accompanying drawings: Figure 1 is a vertical section of a bowl of a centrifugal cream separator embodying this invention. Fig. 2 is a side elevation of the upper portion of the bowl. Fig. 3 is a top plan view of the skimming shield and the body of the bowl with the cover removed. Fig. 4 is a side elevation of the shield. Figs. 5 and 6 are horizontal sections in lines 5—5 and 6—6, Fig. 1, on an enlarged scale. Fig. 7 is a fragmentary sectional elevation of the cover and shield, on an enlarged scale. Fig. 8 is a horizontal section in line 8—8, Fig. 2, on an enlarged scale. Fig. 9 is a fragmentary sectional elevation showing a modified means of connecting the shield to the body of the bowl.

Like reference characters refer to like parts in the several figures.

Referring to Figs. 1–8, A represents the body of the bowl of a centrifugal creamer or other centrifugal liquid separator, which body may be of any suitable construction and is provided near its open upper end with an annular series of inwardly projecting locking lugs 10. B represents the detachable cover of the bowl which comprises a lower tapering portion 11 and a contracted cylindrical neck 12. C represents the skimming shield or supplemental cover which is arranged within the cover B and comprises a lower tapering portion 13, which corresponds to the tapering portion 11 of the cover, and a cylindrical neck 14, which is arranged within the neck 12 of the cover. This shield is provided at its lower end with an annular series of outwardly projecting locking lugs 15 so arranged that they can be passed downwardly through the spaces between the body lugs 10 and can be engaged against the under sides of the latter by a partial rotation of the shield with reference to the body. The latter is preferably provided below the lugs 10 with an internal shoulder 16 which limits the downward movement of the shield in applying the same to the body and which forms an annular groove or space below the body lugs 10 in which the shield lugs 15 move when turning the shield in applying the same to the body or disconnecting it therefrom. The cover is provided at its base with a flange 17 which overhangs the upper end of the body and is provided with an internal, downwardly-flaring surface 18 and a corresponding, upwardly-tapering surface 19 which surrounds the upper end of the body of the bowl. The cover is further provided within the flange 17 with an annular groove or seat for a packing ring 20 of rubber or other suitable material which bears upon the upper end of the body of the bowl and packs the joint between the body and cover. The latter is pressed downwardly by a screw nut D which is applied to the threaded upper portion 21 of the neck of the shield and bears upon the neck of the cover, the downward pressure of the nut upon the cover tightening the shield lugs 15 against the under sides of the body lugs 10. By this means the cover is secured to the body and the packing is compressed between the body and cover by a straight pressure acting in the axial direction of the bowl, and this is accomplished without the employment of a feed tube, post or other connection occupying a central position in the body and obstructing the axial portion of the bowl, so that the axial portion of the bowl is left free and unobstructed.

In the modified construction represented in Fig. 9, the shield is attached to the body of the bowl by means of a screw-threaded base portion 22 which is screwed into an internal screw-thread 23 formed in the upper portion of the body.

The shield is registered or interlocked with reference to the cover against circumferential or rotary displacement by means of a projection 24, Figs. 1, 3, 4 and 6, formed on the outer side of the neck of the shield and engaging in an upright groove or depression 25 in the neck of the cover. The cover is registered or interlocked with reference to the body of the bowl in a similar manner by means of a projection 26, Figs. 2, 3 and 8, formed on the outer side of the body and entering an upright notch or depression 27 in the overhanging base flange 17 of the cover. In assembling the parts the shield is applied to the body of the bowl and when it has been properly placed in the same the cover is applied to the shield and the body of the bowl and is interlocked with the shield and the body by the registering devices and finally tightened and secured by applying the screw nut. These interlocking or registering devices fix the relative position of the body, cover and shield and insure that these parts will always occupy the proper relative position, when assembled, thereby preserving the balance of the bowl, insuring the proper engagement of the shield lugs with the body lugs, and preventing improper or excessive strains in tightening the nut on the neck of the shield.

The passages for the discharge of the separated cream and skimmilk are constructed as follows, in the construction represented in Figs. 1–8. The shield is provided on its upper side with radial spacing ribs 30 forming flow spaces 31 between the shield and the cover, into which spaces the skimmilk enters through the spaces between the interlocked body lugs 10 and shield lugs 15. These flow spaces communicate at their upper ends with an annular chamber 32 formed in the lower portion of the neck of the cover, from which chamber the skimmilk passes inwardly and into the neck of the shield through openings 33 formed in the lower portion of the neck. The skimmilk passes out of the neck of the shield through openings 34 arranged at a higher level than the openings 33 and delivers the skimmilk to an annular channel 35, from which the skimmilk escapes through notches 36. The channel 35 may be formed in the outer surface of the neck of the shield, as shown in Figs. 1, 5 and 7, or it may be formed in the inner surface of the neck of the cover, or in both of these parts, as may be preferred. The notches 36 may be formed in the lower edge of the nut, as shown in Figs. 1, 2 and 7, or in the upper edge of the neck of the cover.

40 represents the bottom ring secured in the neck of the shield and provided with a rotatable regulating plug or screw 41 for the light liquid having an eccentric bore or passage 42 through which the separated cream passes from the bowl into a channel formed between upright walls 43 in the neck of the shield and leading to a discharge opening 44 in the top flange 45.

The shield is preferably pressed out of steel or other suitable metal and the bottom ring is made separate from the shield and secured in the same.

In the construction represented in Fig. 9, the shield is provided near its lower end with openings 46 through which the skimmilk passes from the body of the bowl into the flow spaces above the shield.

I claim as my invention:

1. The combination with the body of a separator bowl and the removable cover thereof, of a detachable internal skimming shield, means for connecting the inner portion of said shield with said body, and means applied to the outer portion of said shield for engaging said cover and holding the latter upon the body.

2. The combination with the body of a separator bowl and the removable cover thereof, of a detachable internal skimming shield, means for connecting the inner portion of said shield with said body, and a screw nut applied to the outer portion of said shield for engaging said cover and holding the latter to the body.

3. The combination with the body of a separator bowl, the removable cover thereof and a packing interposed between said body and cover, of a detachable internal skimming shield, means for connecting the inner portion of said shield with said body, and means applied to the outer portion of said shield for engaging said cover and pressing the latter toward the body and compressing the packing.

4. The combination with the body of a separator bowl and the removable cover thereof having a contracted neck, of a detachable internal skimming shield having a neck arranged within the neck of the cover, means for connecting the inner portion of said shield with said body, and means applied to the neck of said shield for engaging the neck of said cover and holding the cover to the body.

5. The combination with the body of a separator bowl and the removable cover thereof having a contracted neck, of a detachable internal skimming shield having a neck arranged within the neck of the cover, means for connecting the inner portion of said shield with said body, and a screw nut applied to the neck of said shield and bearing against the neck of the cover for holding the cover to the body.

6. The combination with the body of a separator bowl having internal locking lugs near its open end, and a cover, of an internal skimming shield having locking lugs adapted to engage said body lugs, and means applied to said shield and engaging said cover for holding the latter to the body.

7. The combination with the body of a separator bowl having internal locking lugs near its open end, and a cover, of an internal skimming shield having locking lugs adapted to engage said body lugs, and a screw nut applied to said shield and bearing against said cover for holding the cover to the body.

8. The combination with the body of a separator bowl having internal locking lugs near its open end, and a cover having a contracted neck, of an internal skimming shield having locking lugs adapted to engage said body lugs and having a neck arranged within the neck of the cover, and a screw nut applied to the neck of said shield and bearing against the neck of the cover.

9. The combination with the body of a separator bowl having internal locking lugs near its open end and below said lugs a shoulder separated from said lugs by an annular space, of an internal skimming shield having locking lugs adapted to move circumferentially in said space and engage said body lugs, a cover for said body, and means applied to said shield and engaging said cover for holding said cover to said body.

10. The combination with the body of a separator bowl having internal locking lugs near its open end, and a cover, of an internal skimming shield separated from said cover by flow spaces for the heavy liquid and having locking lugs which are engaged with said body lugs, said interlocked body lugs and shield lugs being separated by flow spaces for the heavy liquid, and means applied to said shield and engaging the cover for holding the latter to the body.

11. The combination with the body of a separator bowl and the removable cover thereof, of a detachable internal skimming shield, means for connecting the inner portion of said shield with said body, means for interlocking the cover with the shield against relative rotary movement, and means applied to the outer portion of the shield and engaging the cover for holding the latter to the body.

12. The combination with the body of a separator bowl and the removable cover thereof, of a detachable internal skimming shield, means for connecting the inner portion of said shield with said body, means for interlocking the cover with the body against relative rotary movement, and means applied to the outer portion of the shield and engaging the cover for holding the latter to the body.

13. The combination with the body of a separator bowl and the removable cover thereof, of a detachable internal skimming shield, means for connecting the inner portion of said shield with said body, means for interlocking the cover with the shield against relative rotary movement, means for interlocking the cover with the body against relative rotary movement, and means applied to the outer portion of the shield and engaging the cover for holding the latter to the body.

14. The combination with the body of a separator bowl and the removable cover thereof having an upright registering groove, of an internal skimming shield having a registering projection adapted to enter said groove, means for connecting the inner portion of said shield with said body, and means applied to the outer portion of said shield and engaging the cover for holding the latter to the body.

15. The combination with the body of a separator bowl having a registering projection and the removable cover thereof having in its edge a notch receiving said projection, of an internal skimming shield, means for connecting said shield with said body, and means applied to the shield and engaging the cover for holding the latter to the body.

16. The combination with the body of a separator bowl and the cover thereof having a contracted neck, of an internal skimming shield having a neck arranged within the neck of the cover, means for conducting the heavy liquid to the interior of the neck of the shield, means for connecting the inner portion of the shield with the body of the bowl, and a nut applied to the neck of the shield and bearing upon the neck of the cover, the necks of the shield and cover and said nut being provided with flow passages extending from the interior of the neck of the shield outwardly between the neck of the cover and said nut.

Witness my hand in the presence of two subscribing witnesses.

HARVEY FELDMEIER.

Witnesses:
 GEORGE I. DALE,
 GEO. W. BELLINGER.

Copies of this patent may be obtained for five cents each, by addressing the "Commissioner of Patents, Washington, D. C."